(12) United States Patent
Gupta et al.

(10) Patent No.: US 12,380,364 B2
(45) Date of Patent: Aug. 5, 2025

(54) OUTLIER DETERMINATION AMONG MODELS OF FUTURE EVENT PREDICTION

(71) Applicant: PeerNova, Inc., San Jose, CA (US)

(72) Inventors: Kartik Gupta, New York, NY (US); Gangesh Kumar Ganesan, Half Moon Bay, CA (US); Erika Aine Lunceford, Belmont, CA (US)

(73) Assignee: PeerNova, Inc., San Jose, CA (US)

( * ) Notice: Subject to any disclaimer, the term of this patent is extended or adjusted under 35 U.S.C. 154(b) by 915 days.

(21) Appl. No.: 17/468,605

(22) Filed: Sep. 7, 2021

(65) Prior Publication Data
US 2023/0075475 A1     Mar. 9, 2023

(51) Int. Cl.
| | | |
|---|---|---|
| G06N 20/00 | (2019.01) | |
| G06F 17/18 | (2006.01) | |
| G06N 7/01 | (2023.01) | |

(52) U.S. Cl.
CPC ............. G06N 20/00 (2019.01); G06F 17/18 (2013.01); G06N 7/01 (2023.01)

(58) Field of Classification Search
CPC ........... G06N 20/00; G06N 7/01; G06F 17/18
See application file for complete search history.

(56) References Cited

U.S. PATENT DOCUMENTS

| | | |
|---|---|---|
| 2007/0250292 A1 | 10/2007 | Alagappan et al. |
| 2019/0004484 A1 | 1/2019 | Cussonneau et al. |
| 2019/0228296 A1* | 7/2019 | Gefen ..................... G06N 7/01 |
| 2021/0166151 A1* | 6/2021 | Kennel .................. G06N 20/00 |
| 2021/0173377 A1 | 6/2021 | Laftchiev et al. |
| 2021/0264225 A1 | 8/2021 | McCarson |
| 2021/0325838 A1* | 10/2021 | Abe ......................... G06N 5/04 |
| 2022/0215289 A1* | 7/2022 | Mopur ................... G06N 3/045 |
| 2023/0075475 A1* | 3/2023 | Gupta ..................... G06F 17/18 |
| 2023/0161637 A1* | 5/2023 | Soualhia ............... H04L 41/147 |
| | | 718/102 |
| 2023/0289619 A1* | 9/2023 | Hodos .................... G06N 20/00 |
| 2023/0384355 A1* | 11/2023 | Xu ..................... G01R 19/2513 |
| 2024/0001912 A1* | 1/2024 | Cardona ................ G11B 27/10 |

OTHER PUBLICATIONS

International Search Report and Written Opinion, Patent Cooperation Treaty Application No. PCT/US2022/042583, dated Dec. 30, 2022, 15 pages.

* cited by examiner

*Primary Examiner* — David E Choi
(74) *Attorney, Agent, or Firm* — Fenwick & West LLP (57) ABSTRACT

A prediction consensus system receives predicted event values for an event. The predicted event values are generated by various computer models that may have different training schemes and input data. The prediction consensus system generates a consensus value based on the predicted event values after excluding outliers. Outliers are determined among the predicted event values based on statistical measures of the predicted event values as well as observed event values. The predicted event values that appear to be outliers based on the predicted statistical measures may nonetheless be included when they are within the observed statistical measures. This ensures the predicted event values used in the consensus values are not unduly biased towards other predicted event values. Similarly, the identification of event values as accepted or an outlier may be returned as training data for retraining the computer models that generated the predicted event values.

20 Claims, 5 Drawing Sheets

OUTLIER DETERMINATION AMONG MODELS OF FUTURE EVENT PREDICTION

BACKGROUND

This invention relates generally to determining consensus values among model predictions and identifying outliers among predicted event values.

Many computer modeling systems predict the outcomes of various events in the future. For example, systems may predict the weather, rainfall, environmental conditions, logistics information, and the like. Such predicted conditions may include some predictable and some stochastic elements. Computer models may thus often be efficient ways for predicting/determining such values, particularly where underlying information about the systems may be difficult to determine with certainty. As one solution, systems that make predictions related to events in these environments may share predicted event values to determine a consensus value among them.

Values provided from such predicted systems, however, may diverge from one another significantly, and may also diverge from observable data about the events. It would thus be valuable to improve such consensus-based approaches to account for data variation among predictions and account for differences from observable data associated with the predicted time.

SUMMARY

A prediction consensus system receives predicted event values generated by a plurality of event prediction systems, each of which may operate its own computer model that predicts a predicted event value. A predicted event value is a value predicted for a particular event at a particular time, for example, the weather at a particular location and point in time. Each event prediction system may thus generate its own predicted event value using unique computer models.

The prediction consensus system receives the predicted event values from the event prediction systems and generates a set of predicted statistical measures that characterize the predicted values. Similarly, the prediction consensus system receives observed event values about the event and generates a set of observed statistical measures that characterize the observed event values. The observed event values are determined from an observed measure of the event and may be from sensor or other data related to the event.

Using the statistical measures generated from the predicted event values and the observed event values, the prediction consensus system labels each predicted event value as an accepted event value or an outlier. Predicted event values may thus be determined as outliers relative to other predicted event values and with respect to the observed event values. In one embodiment, predicted event values are initially determined as outliers with respect to the predicted statistical measures, and the initial outliers may be determined as accepted when they are nonetheless within the observed statistical measures.

The accepted predicted event values are then used (i.e., without the outliers) to generate consensus values from the event prediction systems. The consensus values may then be shared among the event prediction systems. In such systems, although certain observed data is available for the event, it may nonetheless be preferable to use the consensus values for the event. For example, the predicted values may provide additional data points relative to the observed values, the observed values may be statistically noisy, may lack effective smoothing, or may not be accessible to the event prediction systems. Improving the selection of which predicted event values are used in the calculation of consensus values thus improves the resulting consensus relative to observed data while retaining a focus on predicted values.

In this way, although the predicted event values may be generated by various computer-generated models, the predicted values are generally allowed to be used when other models agree (i.e., they are within the predicted statistical measures). However, when some models' predicted values appear to deviate significantly from others (e.g., appear to be outliers relative to other such models), this deviation may nonetheless be "correct" when it is consistent with the observed data. As such, including these predicted values, rather than discarding them, improves the consensus generated by the event prediction systems.

Finally, the consensus values and labeled predicted event values may be used to train the computer models used by the event prediction models. By improving the labeling of predicted event values as accepted or outliers, the consensus system can improve the training data provided to the event prediction systems. Particularly, labeling predicted event values based both relative to other predicted events as well as observed data prevents models from unduly gravitating towards predicted event values that are similar to predicted event values from other computer models. I.e., while the consensus values may be generated based on "votes" from many models, by accepting and using predicted values that nonetheless are within statistical measures from observed data, the models' consensus (and training data based on accepted/outlier status) can be prevented from overfitting other model predictions and inhibit potential collusive behaviors. In addition, an event prediction system may gain this benefit in training its respective computer model even when underlying data from other systems' predicted values and from observed events are not accessible to the event prediction system—improved feedback on its values' acceptance or rejection (as an outlier) may alone improve retaining the model at that system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
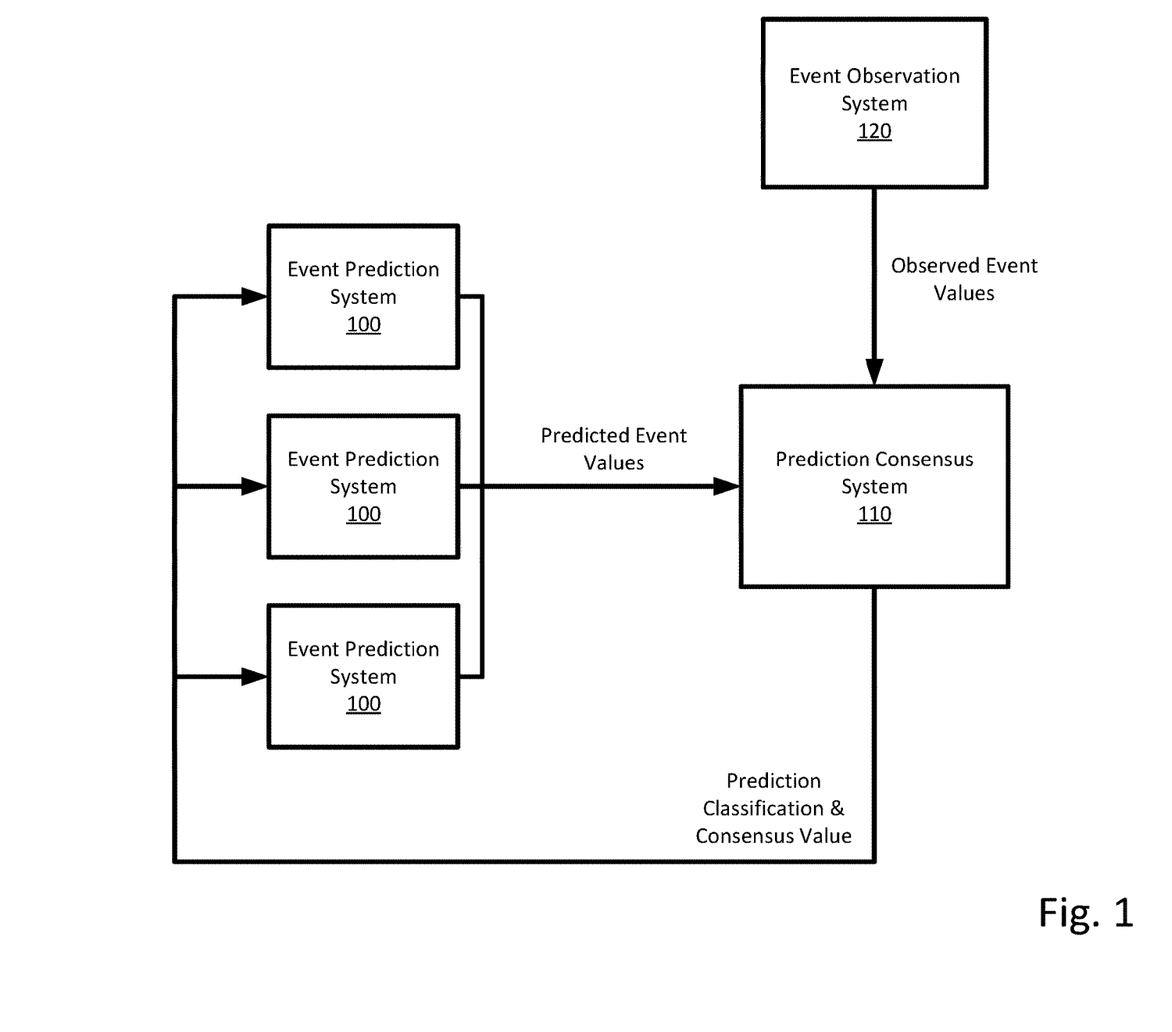
FIG. 1. shows an example environment for generating consensus values from predicted event values of computer models, according to one embodiment.

FIG. 1. shows an example environment for generating consensus values from predicted event values of computer models, according to one embodiment. In this example, event prediction systems 100 generate predicted event values from one or more computer-trained models. The predicted event values are predictions made from such computer models regarding a specific value for an event at a point in time. For example, the weather at a particular geographical area at a particular time. In various embodiments, the particular event predicted by the event prediction systems vary, as may the models used by the event prediction systems 100 in predicting the events. As an example, the same model may be used by a given event prediction system to predict the weather at many individual locations at a particular time of day, and further may predict the weather at various times of day. As an example, one model at an event prediction system 100 may be used to predict the weather on December 25 in each of New York, Los Angeles, and Chicago, at each of 6 A.M. and 6 P.M. Thus, for example a single model may be used to generate several different predicted event values for various events. For example, one model (or event prediction system) may generate several predicted event values of weather for a day:

| Predicted Event (Weather at Location & Time) | Predicted Event Value |
|---|---|
| New York Dec. 25, 6:00 A.M. | 25° F., cloudy (0% snow) |
| New York Dec. 25, 6:00 P.M. | 30° F., clear (0% snow) |
| Los Angeles Dec. 25, 6:00 A.M. | 45° F., clear (10% rain) |
| Los Angeles Dec. 25, 6:00 P.M. | 47° F., cloudy (90% rain) |
| Chicago Dec. 25, 6:00 A.M. | 12° F., cloudy (40% snow) |
| Chicago Dec. 25, 6:00 P.M. | 15° F., cloudy (90% snow) |

In this example, the predicted weather at a particular time and place, such as [25° F., cloudy, and 0% chance of snow] is a predicted event value for the predicted event of the weather in New York at December 25. Each event prediction system 100 may thus generate many such predicted event values for various events and provide the predicted values to the prediction consensus system 110.

The prediction consensus system 110 evaluates the predicted event values for the same event from various event prediction systems to select predicted event values to be used in the determination of a consensus value among the various predicted event values for a given event. In evaluating the predicted event values, the prediction consensus system 110 classifies each prediction (a prediction classification) as either accepted or an outlier. The set of accepted values for a particular event are used in the generation of the consensus value. The prediction classification and consensus value may be sent to the event prediction systems 100 to inform the systems of the consensus value and of whether systems' values are accepted and used in the consensus calculation.

To determine whether predicted event values are an outlier for the event, the prediction consensus system 100 generates statistics of the predicted event values to compare the various event values for an event with one another. In addition, the prediction consensus system 110 may also receive observed event values from one or more event observation systems 120. Though one event observation system is shown, many such systems may be used to provide various observed event values to the prediction consensus system 110. The observed event values are measurable, detectable values associated with the event. For example, the observed event values for a weather event may be sensors disposed in areas of a city that measure temperature and precipitation. The event observation system 120 may collect data from such sensors and report the observed values to the prediction consensus system 110. To continue the example, the weather sensors may be located in different portions of the city, such as the north, east, south, and northwest and may provide various readings of temperature and precipitation with various observed event values that may differ from each other. The weather sensor in the north may indicate a temperature of 26° F. at 6:00 P.M., while the sensor in the east may indicate a temperature of 33° F. at 6:00 P.M.

As such, the events measured by the event observation system 120 may differ from the predicted event values of the event prediction system 100. Likewise, the predicted event values may differ in scope from the observed events and the consensus value (after identifying outliers) may otherwise be a better value to represent a value for the event than simply using the observed event values. In additional examples, the event prediction systems 100 may not have access to the observed event values from the event observation system 120. In this example, the prediction consensus system 110 may thus provide a mechanism for determining outliers and a consensus value that benefits from the observed event values but does not provide the observed event values to the event prediction systems 100, providing additional privacy or data screening to the event observation systems 120.

In this way the prediction consensus system 110 provides information to the event prediction systems 100 indicating the prediction classification (accepted or outlier) and a consensus value to the event prediction systems 100. In some embodiments, the prediction consensus system 110 may also limit information visibility by the various event prediction systems 100 to the predicted event values of other systems. As such, each event prediction system 100 may receive the prediction classification only of the predicted event values generated by that event prediction system. However, each event prediction system may still benefit from a consensus value generated based on the collective "wisdom" from the various event prediction systems 100 and the respective predicted event values generated from each of the many event prediction. Accordingly, in one embodiment the prediction consensus system 110 sends each event prediction system the consensus value determined from the various predicted values and a prediction classification of whether the event prediction system's value was accepted or an outlier. This further permits the prediction consensus system to report a consensus derived from the plurality of predicted event values while maintaining the privacy of the predicted event values and the observed event values. In further embodiments, each event prediction system 100 may receive an indication of whether other predicted event values from other event prediction systems were accepted, but not the underlying predicted values.

Figure 2:
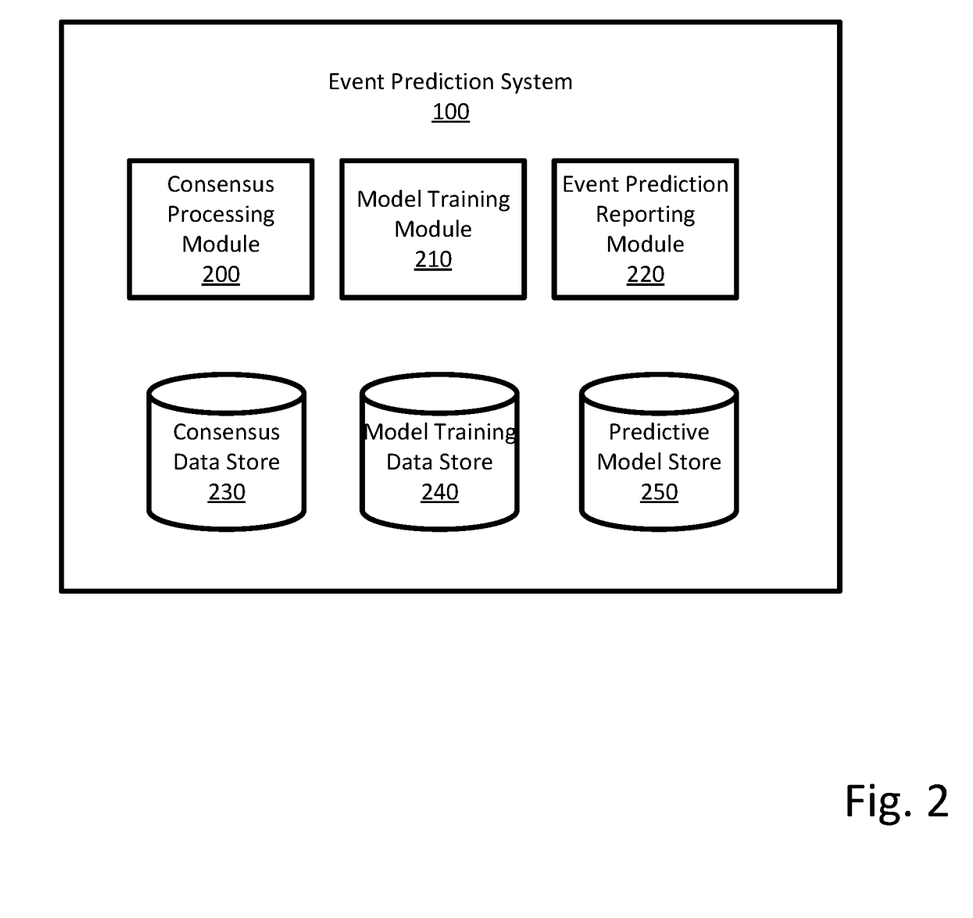
FIG. 2 illustrates components of an event prediction system 100, according to one embodiment.

FIG. 2 illustrates components of an event prediction system 100, according to one embodiment. The event prediction system 100 includes various modules to generate an event prediction and use the consensus value received from the prediction consensus system 110. As shown in the embodiment of FIG. 2, the event prediction system includes a consensus processing module 200, a model training module 210 and an event prediction reporting module 220. More or fewer computing modules may be included in additional embodiments. The event prediction system 100 may also include various data stores, such as a consensus data store 230, model training store 240, and predictive model store 250.

When the event prediction system 100 receives a consensus value and prediction classification from the prediction consensus system 110, these may be received by the consensus processing module 220. The consensus value for an event is stored at the consensus data store 230. In addition, the consensus processing module 200 may send the consensus value to additional subscribers, such as additional computing systems that may use the consensus value. As one example, the consensus value may be reported to additional systems that use the predicted value (e.g., the weather) for further processing, calculating, or reporting.

The model training module 210 trains predictive computer models that may be used to generate the predicted event values. The model training module 210 retrieves training data from the model training data store 240 and uses the data to train predictive computer models that are stored in the predictive model store 250. The particular model structure and organization may differ according to the specific type of predicted event and other design considerations. Such models may include various types of classifiers, neural networks, linear models, etc. that may be used to predict future event values.

The model training data store 240 includes historical event data that describes prior event data that may be used in training the predictive model. In addition, the classification of prior predictions by a trained model (i.e., as either accepted or outlier) may also be stored in the model training data store 240. The status of a model as predicting accepted or outlier data may thus be used by the model training module 210 to further refine training of further models. For example, the model training module 210 may use the classification as additional data points in the training such that re-trained models have an objective function that reduces error with respect to prior predictions and predicted data points (e.g., to positively reinforce predicted event values that were accepted and negatively reinforce predicted event values that were outliers). In addition, as the training may then include actual event data values (e.g., from historical event data), and feedback from predicted event values, the objective function may include a factor to estimate an error relative to the importance of those types of training data. For example, an error with respect to the predicted event values may be considered less relevant than the error relative to historical event values.

Since the acceptance or rejection of a predicted event value by the prediction consensus system 110 may be based on predicted event values as well as observed event values, the event prediction system may thus have greater confidence in using the prediction classification of the model as training data in training the model and increased reliance that the consensus on that basis is well-formed. As a result, the models trained using the classification prediction may also generate better results in future predictions.

After training a model, the model training module 210 may save the model to the predictive model store 250. The event prediction reporting module 220 uses the stored models to generate predicted event values and report the predicted event values to the prediction consensus system 110.

Figure 3:
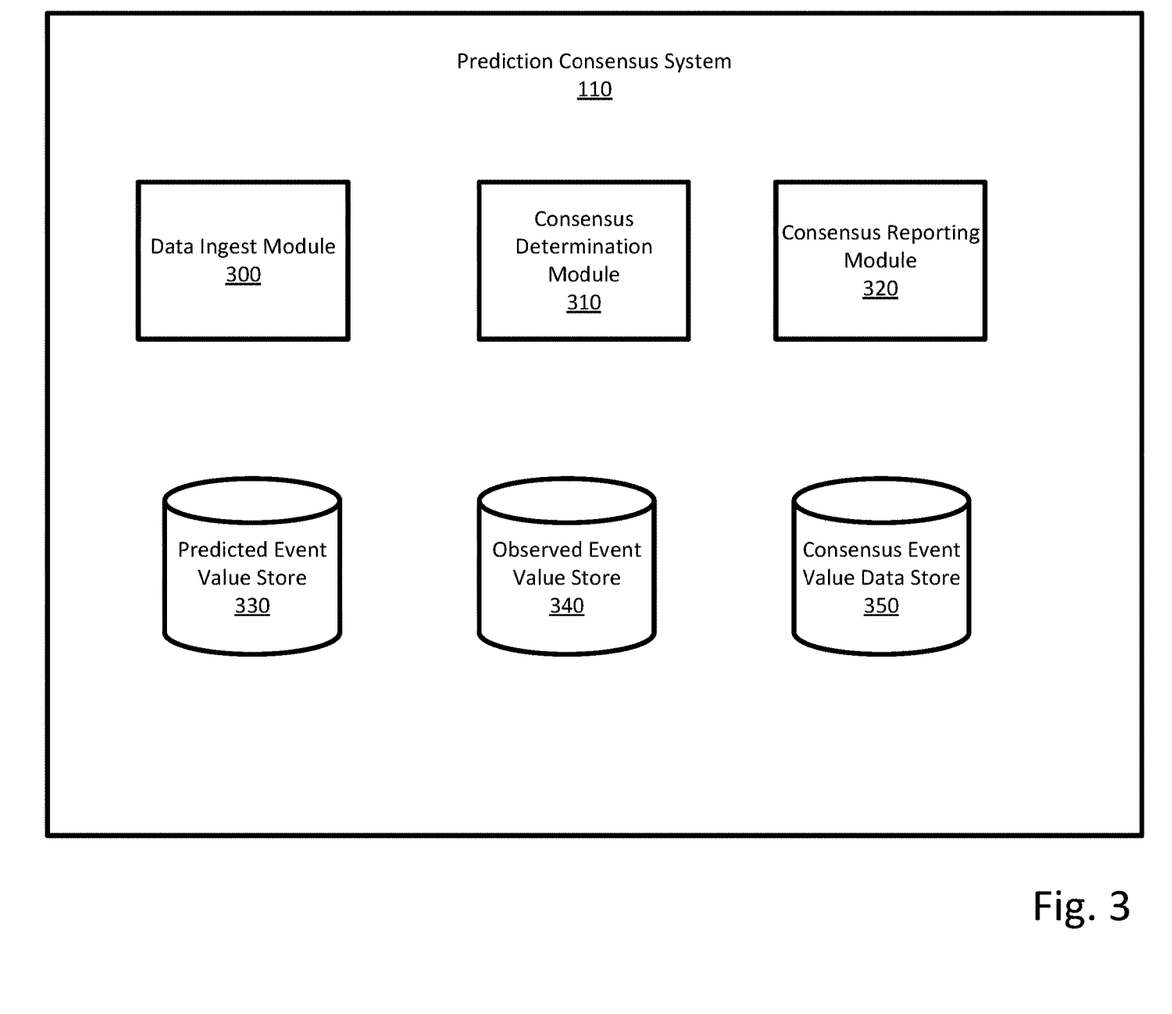
FIG. 3 shows a prediction consensus system 110 according to one embodiment.

FIG. 3 shows a prediction consensus system 110 according to one embodiment. The prediction consensus system 110 includes various modules to receive event data, classify predicted event values, and generate consensus values. The prediction consensus system 110 includes various computing modules including a data ingest module 300, a consensus determination module 310, and a consensus reporting module 320. The data ingest module 300 receives predicted event values from event prediction systems 100 and stores the predicted event values in predicted event value store 330. Likewise, the data ingest module 300 may receive observed event values from an event observation system 120 and store the received observed event values in observed event value store 340. In some embodiments, the event values may be associated with many different types of events as discussed above, many of which may be simultaneously received by the prediction consensus system 110. For example, the table discussed above shows predicted event values associated with events at differing times and locations. To distinguish various types of events, each predicted event value and observed event value may be labeled by the data ingest module 300 with the relevant event. For example, each predicted event value from the various event prediction systems 100 relating to a particular event (e.g., the weather in New York at 6:00 P.M. on December 25) may be labeled with a particular value or key.

The consensus determination module 310 retrieves the predicted event values and observed event values for a given value or key and determines a prediction classification for the predicted event values and identifies a consensus value for the event that is stored in consensus event value data store 350. This determination is further discussed with respect to FIGS. 4 and 5.

The consensus reporting module 320 receives or accesses the consensus event values and reports the consensus event values to the event prediction systems 100. As discussed above, the consensus reporting module 320 may also report the prediction classification for the predicted event values to the event prediction systems 100.

Figure 4:
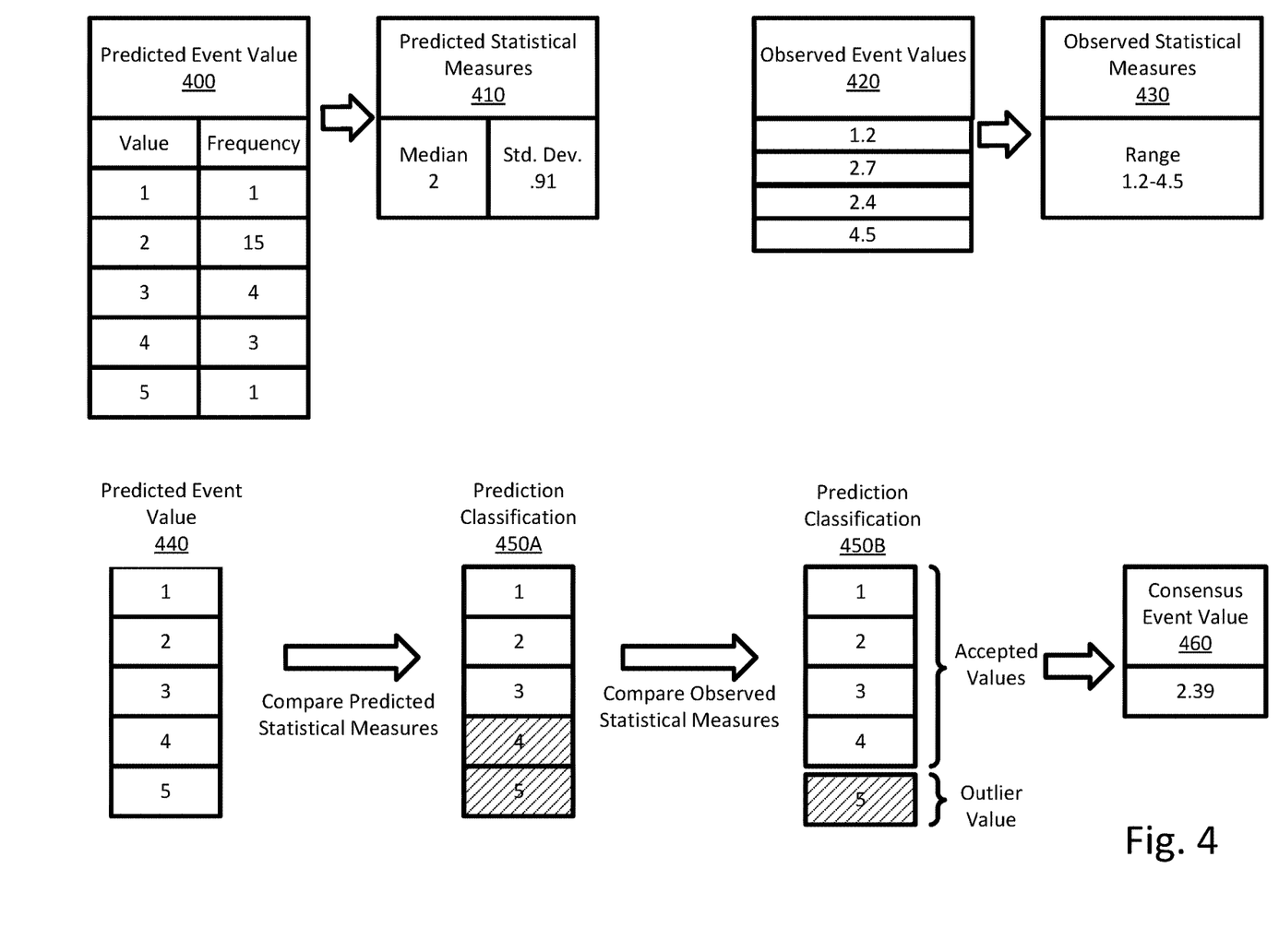
FIG. 4 illustrates an example of determining prediction classifications and a consensus event value according to one embodiment.

FIG. 4 illustrates an example of determining prediction classifications and a consensus event value according to one embodiment. This example may be performed by the prediction consensus system 110 and more particularly by the consensus determination module 310 as discussed above. The predicted event values 400 show example predicted event values for a particular event. In this example, predicted event values 400 were received that range in values from 1 to 5. In this example, a total of twenty-four predicted event values were received, having values 1, 2, 3, 4, or 5. Each predicted event value in this example has a frequency indicating the number of computer models that indicated a particular event value. For example, the predicted event value 400 of 2 has a frequency of 15, indicating that 15 computer models/event prediction systems provided the predicted event value of 2. In other embodiments, the predicted event values may be distributed among a larger range of values and each particular value may be unique.

From the predicted event values 400, a set of predicted statistical measures are calculated to characterize the predicted event values. The predicted statistical measures are used to determine which of the predicted event values 400 may be outliers relative to the set of predicted event values as a whole. Various types of statistical measurements may be applied to the predicted event values 400 to generate the predicted statistical measures 410. For example, the statistical measurements may include an average, mean, median, standard deviation, variance, mode, mean absolute deviation, median average spread, etc. In the example shown in FIG. 4, the predicted statistical measures 410 include the median (2) and a standard deviation (0.91) of the predicted event values 400.

Similarly, the observed event values 420 are also processed to determine observed statistical measures 430. The observed statistical measures are calculated to characterize the observed statistical measures and may be used to determine whether predicted statistical measures which may initially appear to be outliners may nonetheless be acceptable based on observed events. In this example, the observed statistical measures 430 include a range or spread of values in the observed event values 420. The range indicates the highest and the lowest values within the observed event values, in this case the observed event values 420 have a range from 1.2 to 4.5.

The predicted statistical measures 410 and observed statistical measures 430 are used to identify whether predicted event values are accepted values (and can be used in calculating the consensus) or outliers (and may be rejected as forming part of the consensus). Initially, the predicted event values 440 may be assessed with respect to the predicted statistical measures to identify an initial prediction classification 450A. In various embodiments, the specific comparisons to accept or designate outliers may differ. In the embodiment shown in FIG. 4, the predicted event values are accepted if they are within the median±2*std. dev. In this example, the median is 2 and the std dev. is 0.91, such that acceptable values are between 0.2 and 3.8. As such, the initial prediction classification 450A includes predicted event values 1, 2, and 3, while designating values 4 and 5 as outliers.

In additional embodiments, additional metrics may be used to designate values as accepted or outliers with respect to the predicted statistical measures. For example, certain measures may be based on individual predicted event values, such as the standard deviation discussed above. As an additional individual predicted event value comparison, an event value may be indicated as an outlier when it is not within a threshold of the median average spread.

In addition to metrics related to specific predicted event values, an additional comparison is made in certain embodiments based on "collective" values related to the predicted statistical measures. When the predicted statistical measures indicate significant variation within the predicted event values, points may be excluded based on that variation. As one example, when the median and mean values differ by more than 20%, the predicted event value with the highest difference from the median may be excluded. In another example, when the mean absolute deviation and the standard deviation differ by more than 20%, the predicted event value with the highest difference from the median may be excluded. In additional embodiments, the predicted statistical measures may be recalculated and the predicted event values 440 are re-evaluated until no additional points are identified as outliers.

After determining the initial prediction classification 450A, the predicted event values may then be evaluated relative to the observed statistical measures. By comparing the predicted event values with the observed statistical measures, the prediction classification can be modified to accept predicted event values that appeared to be outliers based on the predictions from other prediction models, but which adequately fit existing measured data. In this example, the predicted event values are re-evaluated based on the range of values of the observed statistical measures, in which the predicted event value of 4 is within the range of values (1.2-4.5) of the observed event values. The predicted event value of 4 is then reclassified as an acceptable value in the prediction classification 450B. In this embodiment, a predicted event value may be accepted when it meets requirements based on either the predicted statistical measures or the observed statistical measures. As shown in this example, the predicted event value of 1 is accepted because it is within the median±2*std. dev. of the predicted statistical measures, while the predicted event value of 4 is accepted because it is within the range of the observed statistical measures. By including multiple types of event statistics, based both on predicted and observed values, the thresholds for accepting values may dynamically change over time.

After designating values as accepted or an outlier, the accepted values may then be used to calculate a consensus event value 460. In this example, the frequency-weighted consensus event value 460 is 2.39. In addition, the final prediction classification 450B may be disseminated to the event prediction systems as discussed above, to permit, for example, improved model training that incorporates the prediction classification of values output by the model.

Figure 5:
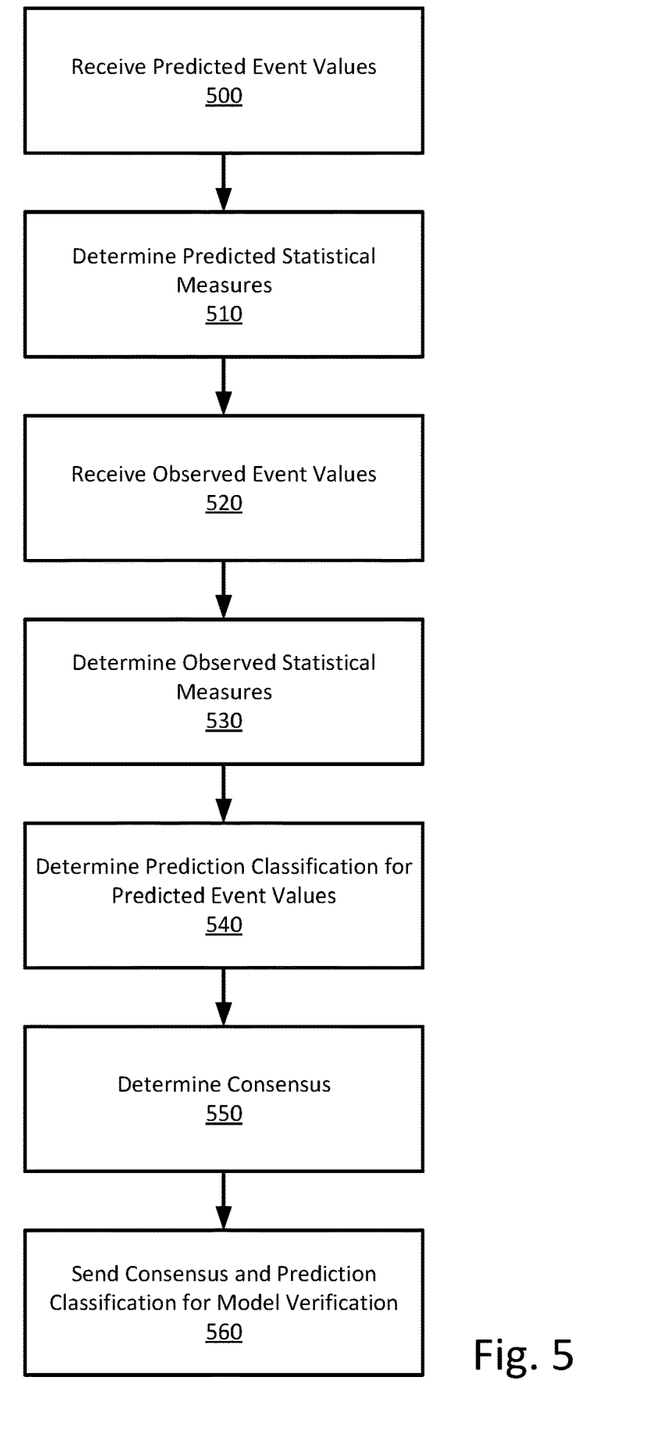
FIG. 5 is an example method for determining a consensus value and prediction classification for predicted event values, according to one embodiment.

FIG. 5 is an example method for determining a consensus value and prediction classification for predicted event values, according to one embodiment. In one embodiment, this method is performed by components of a prediction consensus system 110. To evaluate predicted event values, the predicted event values for evaluation are received 500. Next, the set of predicted statistical measures 510 are generated based on the predicted event values, as discussed above. Similarly, the observed event values are received 520 and observed statistical measures are determined 530 from the observed event values. Using the statistical measures, a prediction classification for each of the predicted event values is determined 540. As discussed above, the predicted event values may initially be compared against the predicted statistical measures to determine initial outliers, which may then be further compared against the observed statistical measures. In one embodiment, predicted event values which are outside the predicted statistical measures, but inside the observed statistical measures are considered accepted values. Finally, the accepted values are used to determine 550 a consensus predicted value for the event and sent 560 with the prediction classification for model verification and training to the event prediction systems.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for evaluating automatic computer model event prediction, the method comprising:
   receiving, from a set of event prediction systems each operating a trained computer model, a set of predicted event values for a predicted event at a time, each predicted event value being generated from the trained computer model of the respective event prediction system;
   determining a set of predicted statistical measures based on the plurality of predicted event values;
   receiving a set of observed event values for the predicted event at the time, the observed event values describing observational data about the event determined in association with the time;
   determining a set of observed statistical measures based on the set of observed event values;
   determining a prediction classification for each predicted event value of the set of predicted event values by comparing the set of predicted event values to the set of predicted statistical measures and the set of observed statistical measures, the prediction classification indicating whether the predicted event value is accepted or an outlier, wherein at least one predicted event value in the set of predicted event values is not accepted based on the set of predicted statistical measures but is accepted based on the set of observed statistical measures;
   determining a consensus event value based on the set of predicted event values having an accepted prediction classification; and
   sending the consensus event value to the plurality of event prediction systems for verification of the trained computer models, wherein the set of observed event values is not shared or sent to the event prediction systems.

2. The method of claim 1, further comprising sending the prediction classification for at least one predicted event value to the respective event prediction system, wherein the event prediction system uses the prediction classification to retrain the computer model.

3. The method of claim 1, wherein the predicted statistical measures include a median, mode, average, or standard deviation.

4. The method of claim 1, wherein the observed statistical measures include a range.

5. The method of claim 1, wherein determining the prediction classification comprises accepting a predicted event value when the value is within a median and standard deviation of the predicted statistical measures or within a range of the observed statistical measures.

6. The method of claim 1, wherein the trained computer models of the respective event prediction systems are trained with separate data sets that are not shared with other event prediction systems.

7. The method of claim 1, wherein the at least one predicted value is not within a median and standard deviation of the predicted statistical measures but is within a range of the observed statistical measures.

8. A non-transitory computer-readable storage medium having encoded instructions executable by a processor for:
   receiving, from a set of event prediction systems each operating a trained computer model, a set of predicted event values for a predicted event at a time, each predicted event value being generated from the trained computer model of the respective event prediction system;
   determining a set of predicted statistical measures based on the plurality of predicted event values;
   receiving a set of observed event values for the predicted event at the time, the observed event values describing observational data about the event determined in association with the time;
   determining a set of observed statistical measures based on the set of observed event values;
   determining a prediction classification for each predicted event value of the set of predicted event values by comparing the set of predicted event values to the set of predicted statistical measures and the set of observed statistical measures, the prediction classification indicating whether the predicted event value is accepted or an outlier, wherein at least one predicted event value in the set of predicted event values is not accepted based on the set of predicted statistical measures but is accepted based on the set of observed statistical measures;
   determining a consensus event value based on the set of predicted event values having an accepted prediction classification; and
   sending the consensus event value to the plurality of event prediction systems for verification of the trained computer models, wherein the set of observed event values is not shared or sent to the event prediction systems.

9. The storage medium of claim 8, further comprising sending the prediction classification for at least one predicted event value to the respective event prediction system, wherein the event prediction system uses the prediction classification to retrain the computer model.

10. The storage medium of claim 8, wherein the predicted statistical measures include a median, mode, average, or standard deviation.

11. The storage medium of claim 8, wherein the observed statistical measures include a range.

12. The storage medium of claim 8, wherein determining the prediction classification comprises accepting a predicted event value when the value is within a median and standard deviation of the predicted statistical measures or within a range of the observed statistical measures.

13. The storage medium of claim 8, wherein the trained computer models of the respective event prediction systems are trained with separate data sets that are not shared with other event prediction systems.

14. The storage medium of claim 8, wherein the at least one predicted value is not within a median and standard deviation of the predicted statistical measures but is within a range of the observed statistical measures.

15. A system comprising:
   a processor configured to execute instructions; and
   a computer-readable storage medium having encoded instructions for execution by the processor for:
      receiving, from a set of event prediction systems each operating a trained computer model, a set of predicted event values for a predicted event at a time, each predicted event value being generated from the trained computer model of the respective event prediction system;
      determining a set of predicted statistical measures based on the plurality of predicted event values;
      receiving a set of observed event values for the predicted event at the time, the observed event values describing observational data about the event determined in association with the time;
      determining a set of observed statistical measures based on the set of observed event values;
      determining a prediction classification for each predicted event value of the set of predicted event values by comparing the set of predicted event values to the set of predicted statistical measures and the set of observed statistical measures, the prediction classification indicating whether the predicted event value is accepted or an outlier, wherein at least one predicted event value in the set of predicted event values is not accepted based on the set of predicted statistical measures but is accepted based on the set of observed statistical measures;
      determining a consensus event value based on the set of predicted event values having an accepted prediction classification; and
      sending the consensus event value to the plurality of event prediction systems for verification of the trained computer models, wherein the set of observed event values is not shared or sent to the event prediction systems.

16. The system of claim 15, the instructions further comprising sending the prediction classification for at least one predicted event value to the respective event prediction system, wherein the event prediction system uses the prediction classification to retrain the computer model.

17. The system of claim 15, wherein the predicted statistical measures include a median, mode, average, or standard deviation.

18. The system of claim 15, wherein the observed statistical measures include a range.

19. The system of claim 15, wherein determining the prediction classification comprises accepting a predicted event value when the value is within a median and standard deviation of the predicted statistical measures or within a range of the observed statistical measures.

20. The system of claim 15, wherein the trained computer models of the respective event prediction systems are trained with separate data sets that are not shared with other event prediction systems.

\* \* \* \* \*